Feb. 10, 1970     S. B. RICE, JR     3,494,790
PREPARATION OF WELDING SURFACES ON SEMICONDUCTORS
Filed Oct. 29, 1965     2 Sheets-Sheet 1
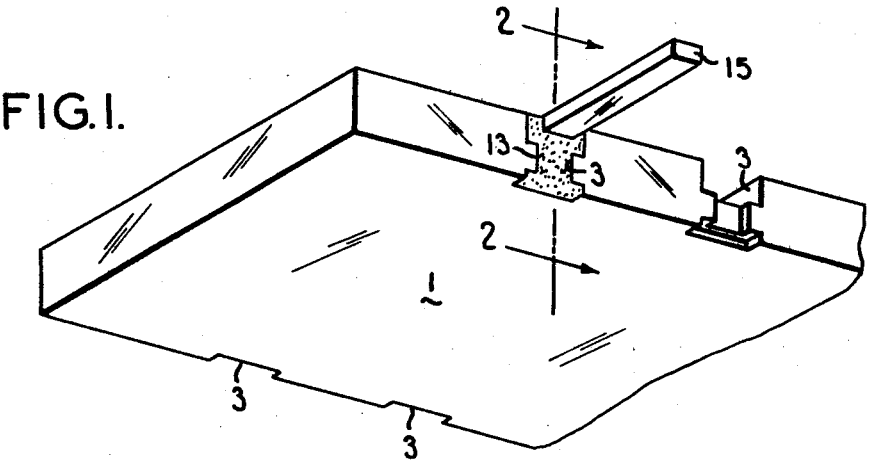
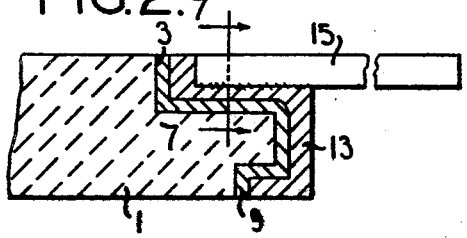 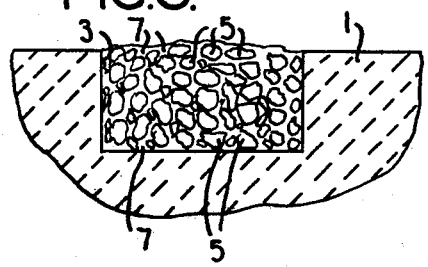
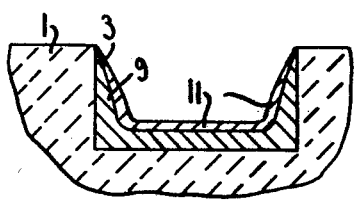 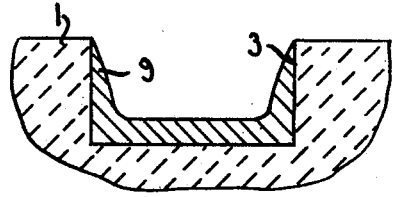
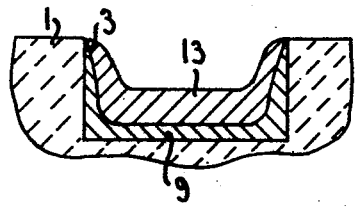 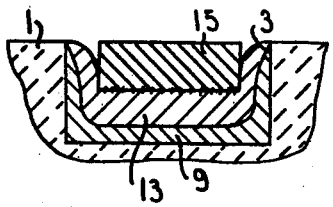

United States Patent Office 3,494,790
Patented Feb. 10, 1970

3,494,790
PREPARATION OF WELDING SURFACES
ON SEMICONDUCTORS
Stanley B. Rice, Jr., Garland, Tex., assignor to Texas Instruments Incorporated, Dallas, Tex., a corporation of Delaware
Filed Oct. 29, 1965, Ser. No. 505,687
Int. Cl. B44d 1/18
U.S. Cl. 117—212    9 Claims

ABSTRACT OF THE DISCLOSURE

A method of forming a weldable surface on a ceramic member by:
(1) dispersing small particles of a metal which will react with the ceramic onto the ceramic surface;
(2) heating the particles under time and temperature conditions which cause a substantial number of the particles to react with the ceramic; and
(3) immersing the ceramic in a nickel solution for depositing a layer of nickel on the reacted area.
An article of manufacture consisting of a ceramic member on the surface of which has been placed a weldable surface area utilizing the above-described method.

---

This invention relates to the preparation of welding surfaces of semiconductors, and with regard to certain more specific features to improved means for obtaining welding surfaces on semiconductor bars or the like to provide for connecting conductive leads thereto.

Among the several objects of the invention may be noted the provision of improved means for forming uniform weldable metal surfaces on portions of semiconductor bars and more particularly on the surfaces of very small or closely spaced marginal grooves or notches therein; the provision of a method of forming such weldable surfaces permitting the advantageous use of extremely small particles of metal not formerly useable in small or closely spaced notches or grooves; and the provision of a method of the class described which requires less time and smaller quantities of certain materials than were heretofore required for forming the desired weldable surfaces on the ceramic bar material. Other objects and features will be in part apparent and in part pointed out hereinafter.

In the accompanying drawings, in which several of various possible embodiments of the invention are illustrated, FIGURE 1 is a fragmentary perspective view of a ceramic semiconductor bar having several sidewise notches or grooves in it, one of which is provided with a weldable surface applied according to the invention;

FIGURE 2 is an enlarged fragmentary section through the groove in the FIGURE 1 ceramic bar, being viewed on line 2—2 of FIGURE 1;

FIGURES 3–6 are sections illustrating diagrammatically various steps employed in carrying out one form of the invention;

FIGURE 7 is a fragmentary cross section taken on line 7—7 of FIGURE 2, showing a conventional lead welded to a prepared surface of a notch or groove;

Figure 8:
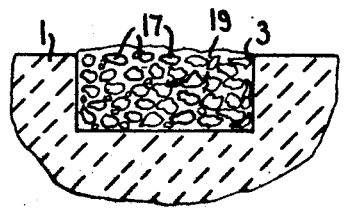
FIGURES 8–12 are sections illustrating diagrammatically various steps employed in carrying out another form of the invention.

For clarity of illustration, dimensions are exaggerated and therefore the drawings are not to exact scale.

Corresponding reference characters indicate corresponding parts throughout the several views of the drawings.

Weldable surfaces have been provided on ceramics containing magnesium oxide and silicate by placing aluminum particles of 1 to 2 mil size in small or closely spaced grooves therein and then reacting the aluminum with the ceramic at a temperature of about 1,000° C. in an atmosphere of helium. After the reaction, excess oxides were scraped from the reacted surface. The reacted surface was then plated with nickel by an electroless plating process. Such nickel plating normally occurs at a rate of about 0.5 mil per hour, and three or four mils of nickel are required in order to obtain a good weldable surface on the ceramic. Thus several hours were required for plating the reacted area. Such ceramics have been used as small ceramic bars in miniaturized semiconductor network packages.

The process above described is satisfactory for grooves as small as about 6 mils deep by 10 mils wide or in widely spaced grooves. However, attempts to metallize smaller grooves by this process were not successful, for example, in grooves 9 mils wide and only 2 or 3 mils deep. Uniform coverage in the desired metallized areas could not be obtained, probably due to the inability of the grooves of such small size to contain sufficient aluminum powder for intimate contact with the ceramic substrate, or in the case of closely spaced grooves, to prevent overlap of conductive material between grooves. Smaller particles of aluminm were tried but they did not react with the ceramic. This was probably due to the thin film of aluminum oxide, about 30 to 40 angstroms thick, which surrounds each aluminum particle. This film is insignificant for aluminum particles of 1 to 2 mils size, but when the particles are very small the ratio of the thickness of the oxide film to the particle size of the aluminum becomes large and the aluminum apparently cannot rupture the film in order to react with the ceramic to form the desired reacted surface. The use of etches to remove the oxide film was tried, but they were found not to be controllable. The present invention permits application of a continuous, uniform layer of metal in very small or closely spaced grooves (or if required, on larger areas) and reduces the time required by prior methods for electroless plating of a satisfactory weldable metal surface of the ceramic bar.

Briefly, one process for metallizing a ceramic according to this invention comprises grinding and mixing together particles of aluminum and another metal (such as tin) having a melting point lower than the melting point of aluminum, then suspending them in a liquid vehicle or carrier and inserting them by means of a hypodermic needle into a groove or other surface of the ceramic. Other applicating means may be employed. Then the ceramic and metals are heated in a furnace at a temperature to melt tin and aluminum. The metals and ceramic react during heating to form a thin continuous metallic film between the ceramic and a layer of unreacted oxide on the surface. After removal of the oxide, the reacted area is then plated by an electroless nickel-plating process to provide a nickel surface to which leads or the like may be welded.

Another embodiment of this invention overcomes the long electroless plating time required. This embodiment comprises applying powdered cuprous oxide to a ceramic surface, sintering it under conditions which result in reducing the cuprous oxide to cupric oxide. Reaction between the cupric oxide and the ceramic forms a good bond with the silicon in the ceramic throughout a reacted area. Then the ceramic is placed in a reduction furnace for removing the oxygen remaining from the cupric oxide. The result is a layer of copper covering the ceramic in the reacted area. This copper layer is pulled off, leaving a very thin molecular layer of copper on the reacted area. Next the ceramic is placed in an electroless nickel-plating solution and plated for about one hour to deposit about 0.5 mil thickness of nickel on the reacted area. Leads can be welded to the plated area.

Referring now more particularly to FIGURES 1-7 of the drawings, at numeral 1 is illustrated a portion of a rectangular ceramic member preferably formed of a mixture of magnesium and silicate, such as forsterite ($2MgO \cdot SiO_2$) or steatite ($MgO \cdot SiO_2$). This member, for example, may constitute a so-called silicon or semiconductor bar on which is a semiconductor network, requiring leads for forming outside connections. Thus the ceramic 1 constitutes a base or substrate for a so called integrated circuit package. There are a plurality of small irregularly shaped marginal notches or grooves 3 in ceramic member 1 which are to be prepared to that leads can be welded to the package.

Small particles of aluminum, preferably less than 1.8 mils in size, and small particles of tin, preferably less than 1.2 mils in size, are ground together to smaller sizes. The preferred ratio of tin to aluminum is one part tin to two parts aluminum by weight. Tin is selected because of its relatively low melting point (about 232° C.). Other metals with low melting points can also be used.

The finely powdered metals are then dispersed in a vehicle or carrier which holds the metals in suspension while they are being applied to the ceramic. The vehicle may be one manufactured by the Du Pont company of Wilmington, Del. and designated in the trade as H-220. Other vehicles which can be used include amyl acetate, dextrim, gum arabic, gum tragacanth, and other organic substances. The Du Pont product is preferred since it leaves practically no residue after firing. The vehicle and metal particles suspended by it are applied in the grooves 3 in ceramic 1. In FIGURE 3 the metal particles in groove 3 are designated 5 and the carrier or vehicle is designated 7.

The ceramic 1, carrying the metal particles 5 and carrier 7, is then placed in a tube furnace and heated in a reducing atmosphere at a temperature of about 800° C. for about one hour. The atmosphere may be hydrogen. During heating the tin particles melt at about 232° C. They have a fluxing or dissolving action on the aluminum oxide or the aluminum particles, so as to release the oxide as the aluminum melts at about 700° C. Then the tin combines with the aluminum particles to form a liquid tin-aluminum alloy. This alloy reacts intimately with the magnesium and silicate of the ceramic so that there is produced a compound or alloy, referred to as spinel ($MgAl_2O_4$). This spinel is present in a reacted area or zone designated 9. At the same time there occurs a layer or coating 11 of unreacted oxide on the reacted zone. The reacted area or zone 9 is firmly adhered to the ceramic 1, whereas the unreacted oxide layer 11 is loose and is easily removed. FIGURE 5 shows the ceramic and reacted zone after the oxide layer 11 has been removed.

It may be noted at this point that the process has been tried employing under the same operating conditions particles of tin or aluminum individually, instead of together. No reaction occurred in either instance. The tin particles coalesced together in globules on the ceramic surface and could be brushed off. The aluminum particles did not react at all, probably, as above mentioned, because the aluminum could not rupture the surrounding film of aluminum oxide to react with the ceramic materials. The oxide-flushing or -dissolving action of the tin removes this difficulty.

Next the ceramic and reacted zone or area 9 are placed in a solution containing nickel (or other weldable metal ions) and the reacted zone 9 is plated by electroless plating with a layer 13 of nickel. This plating occurs by a catalytic decomposition of the solution at the surface of zone 9. A typical electroless plating solution may contain sodium hypophosphite and nickelous chloride with buffers. The reactions which occur are as follows:

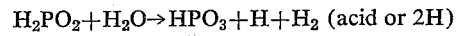

$H_2PO_2 + H_2O \rightarrow HPO_3 + H + H_2$ (acid or 2H)

The hydrogen then reduces the nickel at the surface as follows:

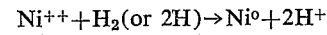

$Ni^{++} + H_2(\text{or } 2H) \rightarrow Ni^0 + 2H^+$

This electroless plating is continued until the desired thickness of the nickel layer 13 is provided. Normally layers of 3 to 4 mils of nickel are required to provide a good weldable metal surface. This plating occurs at a rate of about 0.5 mil per hour. Thus 6 to 8 hours are required to obtain a nickel coating 3 to 4 mils thick. After nickel plating, the nickel is annealed in a conventional manner and leads 15 of Kovar are welded to the metallized surface (see FIGURES 1, 2 and 7).

While the drawings illustrate the nickel layer 13 as being depressed in the center portion and with the lead 15 located in this depression, it will be understood that this is only for the purpose of illustration. Also, there may be some small portion of the reacted zone 9 and the nickel layer 13 present on the surface of ceramic 1 adjacent to the groove 3. If this occurs it can be removed by conventional lapping. It will be understood that low-melting-point metals other than tin may be used for fluxing or dissolving the aluminum oxide from the aluminum particles.

Figure 9:
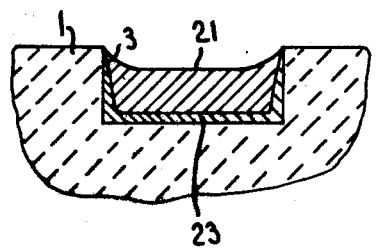

FIGURES 8-13 illustrate an alternative process of forming a weldable area in a marginal notch, groove or other recess 3 in ceramic 1. In this embodiment, small particles 17 of copper in the cuprous form ($Cu_2O$) are mixed with a vehicle or carrier 19 in the manner described in connection with FIGURES 1-7. Carrier 19 may be any of the organic substances above described. The copper and vehicle are applied in the groove 3 (FIGURE 8). The ceramic, metal and vehicle are then placed in a furnace and sintered for about one hour in air at a temperature of approximately 1,000° C. The vehicle carrying the copper is dissipated during sintering (FIGURE 9). At this time the cuprous oxide ($Cu_2O$) reacts with the silicate of the semiconductor 1 to form a good bond while picking up oxygen, which converts the cuprous oxide ($Cu_2O$) to the cupric form ($CuO$). The ceramic and sintered copper are cooled, at which time there exists a crust 21 above the reacted zone 23.

Figure 10:
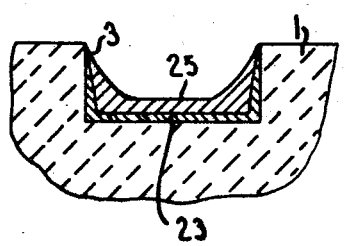
Figure 11:
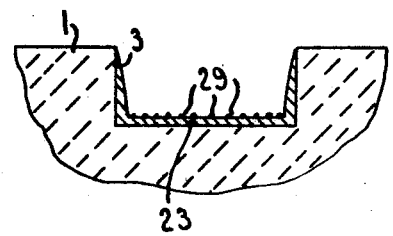
Figure 12:
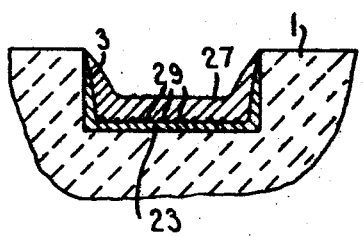
Figure 13:
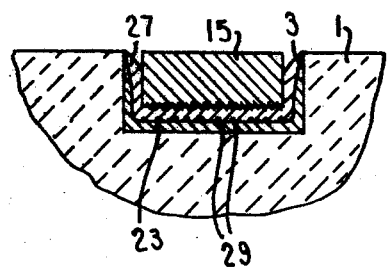
FIGURE 13 is a section similar to FIGURE 12 showing a conventional lead welded to the prepared surface of a notch or groove.

Next the ceramic 1 with the crust 21 on the reacted zone 23 is placed in a reduction furnace. After first flushing the furnace with inert helium to clear out air for safety, hydrogen is introduced into the furnace at a temperature of about 300° C. This temperature is then raised to about 1,000° C. and held for about fifteen minutes. The ceramic is then cooled in the hydrogen atmosphere. After it has cooled and been removed from the hydrogen atmosphere, there occurs a layer 25 of metallic copper covering the reacted zone or area 23 (FIGURE 10). This layer of copper 25 is only loosely adherent and is easily pulled from the reacted zone or area 23 (FIGURE 11). The looseness is apparently due to disruptive stresses caused by differential shrinkage upon cooling. When this loose copper layer is stripped away there is left on the reacted zone 23 a very thin molecular facing of copper. This is indicated by dots 29 in FIGURES 11-13. In view of its extreme thinness, this layer is not disrupted upon cooling and therefore remains tightly on the zone 23.

The ceramic and the reacted zone 23 on which is the molecular copper layer are next exposed to a solution containing nickel and, by electroless plating, a layer of nickel is plated on the reacted zone 23. This nickel layer is designated 27 in FIGURE 12. The electroless plating is continued for approximately one hour and a layer of nickel about 0.5 mil thick is thus obtained on the reacted area 23. This is substantially thinner than the 3 to 4 mils thickness usually required with other processes. If desired, the nickel may be annealed before the leads such as 15 are welded to it.

It may be mentioned that the use of cuprous oxide ($Cu_2O$) for particles 17 is of some importance. An attempt has been made to substitute cupric oxide (CuO) for particles 17 but the result upon reduction in hydrogen was the formation of copper globules formed on the substrate surfaces, and these were not sufficiently adhered.

Ceramic articles produced by either method of the invention may be used in manufacturing integrated semiconductor network packages with leads 15 constituting their outside connections. In manufacturing a package of this type, an appropriate surface of ceramic 1 is coated with a glass frit and fired to form a thin glass glaze. Then circuitry is evaporated on the glaze and connected by internal accessory leads to the metallized groove or notch areas, thereby completing a circuit through the leads 15.

In view of the above, it will be seen that the several objects of the invention are achieved and other advantageous results attained.

As various changes could be made in the above methods, constructions and products without departing from the scope of the invention, it is intended that all matter contained in the above description or shown in the accompanying drawings shall be interpreted as illustrative and not in a limiting sense.

What is claimed is:

1. The method of forming a weldable metallized surface in a narrow shallow groove in a ceramic member, comprising dispersing in a heat-dispersible vehicle small particles of tin and aluminum which will react with the ceramic, applying the metal particles and vehicle in the groove, heating the particles and vehicle under time and temperature conditions which drive off substantially all of the vehicle and cause a substantial number of the particles to react with the ceramic member thereby providing a thin continuous reacted area in the groove, and immersing the reacted area in a solution containing nickel for depositing by electrolysis plating of a layer of nickel on the reacted area.

2. The method according to claim 1, including the step of annealing the nickel plating.

3. The method of applying an aluminum alloy to a ceramic surface, comprising dispersing particles of aluminum and tin in a liquid vehicle, coating the ceramic surface with the vehicle containing the aluminum and tin, and heating the coated ceramic surface at a temperature and for a time sufficient to form an alloy of the aluminum and tin and react the alloy with the ceramic.

4. The method according to claim 3 including the step of grinding aluminum and tin particles of 2 mil size or less to smaller than their original size before dispersing the aluminum and tin particles in a vehicle, and wherein the heating is at a temperature of substantially 800° C. for about one hour to form an aluminum-tin alloy and to react it with the ceramic member, wherein a nickel layer is plated on the reacted material, and further including the step of annealing the nickel plate.

5. The method according to claim 3 wherein the ceramic member contains magnesium and silicate, wherein the heating of the coated ceramic is in a reducing atmosphere at a temperature above the melting point of aluminum to form an aluminum alloy and to react it with the ceramic member thereby providing a thin continuous metallic film in the groove, and wherein a metal layer is formed by immersing the resulting film in a solution containing nickel and depositing by electroless plating a layer of nickel on the aluminum alloy.

6. The method according to claim 5 wherein said particles are of less than 2 mil size, and wherein the heating of the coated ceramic is in a reducing atmosphere at a temperature of substantially 800° C. for approximately an hour to form an aluminum-tin alloy and to react it with the ceramic member thereby providing a thin metallic film in the recess.

7. The method according to claim 6 including the step of annealing the nickel plating.

8. A metallized ceramic article, comprising a ceramic member composed of magnesium oxide and a silicate, a surface area of the member containing products of reaction of aluminum-tin alloy with the ceramic, and a weldable metal layer on the reaction product.

9. A ceramic article according to claim 8, wherein the weldable metal layer comprises 3 to 4 mils of nickel.

References Cited

UNITED STATES PATENTS

| 2,904,456 | 9/1959 | Nolte | 117—212 |
| 3,079,282 | 2/1963 | Haller et al. | 117—212 |
| 3,290,171 | 12/1966 | Zollman et al. | 117—71 X |

FOREIGN PATENTS

| 891,705 | 3/1962 | Great Britain. |

DAVID KLEIN, Primary Examiner

U.S. Cl. X.R.

117—71, 217